US005538028A

United States Patent [19]

Lombardo

[11] Patent Number: 5,538,028

[45] Date of Patent: Jul. 23, 1996

[54] THROTTLING AND DIFFUSING DISPENSING VALVE

[76] Inventor: Samuel N. Lombardo, 1822 Fifth Ave., Arnold, Pa. 15068

[21] Appl. No.: 336,041

[22] Filed: Nov. 4, 1994

Related U.S. Application Data

[60] Continuation-in-part of Ser. No. 105,565, Aug. 13, 1993, Pat. No. 5,390,832, which is a division of Ser. No. 856,690, Mar. 24, 1992, Pat. No. 5,244,117.

[51] Int. Cl.[6] .................... F16K 47/04

[52] U.S. Cl. .................... 137/12.5; 137/170.1; 137/801; 251/118; 251/122; 251/155

[58] Field of Search .................... 137/12.5, 170.1, 137/801, 600; 251/122, 155, 118

[56] References Cited

U.S. PATENT DOCUMENTS

| | | | |
|---|---|---|---|
| 327,402 | 9/1885 | Malmstrom et al. . | |
| 417,336 | 12/1889 | Radvanyi . | |
| 462,576 | 11/1891 | Nadler . | |
| 502,451 | 8/1893 | Walter . | |
| 597,842 | 1/1898 | Edmands | 251/118 |
| 676,009 | 6/1901 | Ripper . | |
| 711,458 | 10/1902 | Bastian . | |
| 782,648 | 2/1905 | Gaensslen | 251/118 X |
| 865,451 | 9/1907 | Swift | 251/118 |
| 2,035,202 | 3/1936 | Smith . | |
| 2,051,509 | 8/1936 | Wile | 251/118 |
| 2,096,202 | 10/1937 | Rocheson | 251/120 X |
| 2,119,383 | 5/1938 | Cornelius . | |
| 2,125,102 | 7/1938 | Cornelius . | |
| 2,162,842 | 6/1939 | Dolison et al. . | |
| 2,173,979 | 9/1939 | Picut . | |
| 2,176,947 | 10/1939 | Anagno . | |
| 2,202,179 | 5/1940 | Welty et al. | 251/120 |
| 2,234,816 | 3/1941 | Anagno . | |
| 2,236,619 | 4/1941 | Cornelius . | |
| 2,325,228 | 7/1943 | Cornelius . | |
| 2,345,840 | 4/1944 | Strong | 251/120 X |
| 2,461,909 | 2/1949 | McClure | 251/120 |
| 2,575,658 | 11/1951 | Del Nero . | |
| 2,628,062 | 2/1953 | Weber . | |
| 2,633,150 | 3/1953 | Lewis . | |
| 2,678,747 | 5/1954 | Caitung . | |
| 2,899,170 | 8/1959 | Cornelius . | |
| 2,924,238 | 2/1960 | Cornelius . | |
| 3,194,533 | 7/1965 | McLay . | |
| 3,238,963 | 3/1966 | Witzel et al. . | |
| 3,291,441 | 12/1966 | Hansen . | |
| 3,426,798 | 2/1969 | Chernak | 251/120 X |
| 4,078,578 | 3/1978 | Buchholz . | |
| 4,194,653 | 3/1980 | Brown . | |

(List continued on next page.)

FOREIGN PATENT DOCUMENTS

| | | | |
|---|---|---|---|
| 3240718 | 5/1984 | Germany | 251/122 |
| 269321 | 8/1927 | Italy | 137/801 |
| 1168 | of 1874 | United Kingdom | 251/122 |
| 278180 | 10/1927 | United Kingdom | 137/801 |
| 950077 | 2/1964 | United Kingdom | 251/122 |
| 1486245 | 9/1977 | United Kingdom . | |

*Primary Examiner*—Gerald A. Michalsky

[57] ABSTRACT

A valve suitable for dispensing effervescent liquids under pressure includes a frusto-conical core member disposed in a similarly configured frusto-conical valve chamber section to both define a restrictive diffusing flow path when the valve is open and the sole pressure seal when the valve is closed. The pressure seal is created along a substantial length of the core member which is preferably made of resiliently compressible plastic to enhance the seal. The outlet spout located downstream of the diffusing flow path is provided with interior baffles to prevent vortical flow and the resulting frothing in the liquid. The valve chamber and components are sloped to assure that all liquid downstream of the seal can flow toward the outlet spout after the valve is closed. Immediately downstream of the diffusing flow path there is a transition path permitting the flowing liquid to expand gradually without cavitation before entering the expanded downstream end of the valve chamber. That chamber is sized sufficiently small so that the outlet spout serves as a restriction to create a back pressure in the liquid and prevent gas bubbles from escaping.

15 Claims, 2 Drawing Sheets

U.S. PATENT DOCUMENTS 4,269,387 5/1981 Reynolds et al. .......................... 251/122
4,694,975 9/1987 Hagan .
4,707,278 11/1987 Breyer et al. .......................... 251/122
4,720,076 1/1988 Hyde .
4,778,081 10/1988 Vaughan .
4,860,932 8/1989 Nagy .
4,995,534 2/1991 Norman .
5,050,806 9/1991 Anderson et al. .
5,244,117 9/1993 Lombardo .

THROTTLING AND DIFFUSING DISPENSING VALVE

CROSS-REFERENCE TO RELATED APPLICATIONS

This application is a continuation-in-part of my U.S. patent application Ser. No. 08/105,565, filed Aug. 13, 1993, now U.S. Pat. No. 5,390,832, which is a divisional application of my U.S. patent application Ser. No. 07/856,690, filed Mar. 24, 1992 (now U.S. Pat. No. 5,244,117). The disclosure in these patent applications is expressly incorporated herein by this reference.

BACKGROUND OF THE INVENTION

1. Technical Field

The present invention pertains to dispenser valves for liquid under pressure and has particular but not limited utility in dispensing effervescent liquids such as beer, soda pop, sparkling wine, etc.

2. Discussion of the Prior Art

A primary problem associated with dispensing effervescent liquids under pressure from a tap or spigot relates to the tendency of the liquid to foam or froth undesirably when forced under pressure through narrow openings of relatively short lengths or through sharp bends and turns. A short narrow opening typically causes the pressurized liquid to expand suddenly after passing the opening, resulting in turbulent foaming. Turbulence is also produced when the liquid is forced to flow around sharp bends before being dispensed.

This problem has been addressed in numerous patents, a typical example being U.S. Pat. No. 2,899,170 (Cornelius). This patent describes an independent decarbonation control device located upstream of an independently actuated faucet valve. The decarbonation control device includes a frusto-conical core member with an upstream portion tapering in an upstream direction to a rounded tip. This upstream portion of the core member is disposed in a similarly tapered frusto-conical chamber. For any given axial position of the core member in the chamber, the transverse annular spacing between the chamber wall and the core member remains constant throughout the core length. The resulting flow passage is thus a frusto-conical annulus of constant radial thickness and gradually increasing area as a function of downstream distance. The gradual increase in flow cross-sectional area over the length of the core member provides a gradual diffusion rather than a sudden expansion of the liquid flowing therethrough, and thereby prevents explosive turbulence and its undesirable foaming effects. Downstream of its frusto-conical portion, the chamber is cylindrical and contains a downstream portion of the core member which tapers slightly in a downstream direction to permit continued enlargement of the flow cross-sectional area. The axial portion of the core member in the chamber is adjusted by a screw to set the cross-sectional area for flow between the frusto-conical core and chamber portions. The goal is to set the axial position of the core member to achieve the desired flow rate for the effervescent liquid, and the position effectively depends on the driving pressure of the liquid and the pressure losses in the delivery line. When properly set the core member permits the effervescent liquid to be dispensed by the separately actuated faucet valve without excessive frothing while providing a reasonably fast flow rate under the existing conditions. It is known, however, that the driving pressure is sensitive to changes in ambient temperature and pressure. In addition, for some applications the driving pressure decreases as more liquid is dispensed from its container. Accordingly, in order to maximize the output flow rate as conditions change, it is necessary to repeatedly readjust the axial position of the core member in its chamber. Although this readjustment procedure is not of itself difficult, it is inconvenient and often ignored. The effectiveness of the core member as a decarbonation control device is therefore severely compromised in practice.

In British Patent Specification No. 1,486,245 (Leroy) there is disclosed a valve member that is movable along with the frusto-conical core member to permit both variation of the restrictor passage and opening/closing of the faucet with a single actuator. The valve member is located at the upstream end of the frusto-conical core member and comprises an annular shoulder on the core member positioned to mate with a similar shoulder on the annular valve seat at the inlet end of the chamber. An O-ring is placed on the core member shoulder to assure a pressure seal in the off position of the valve. Although this single actuator arrangement enhances the convenience of dispensing effervescent beverages, it does not minimize frothing. Specifically, the space between the shoulder region on the core member and the chamber wall immediately downstream of the seal is relatively large compared to the space of the valve opening between the O-ring and chamber wall as the valve is initially opened. The valve opening thus serves as a "pinch point" or restriction. Immediately downstream of this restriction, as the valve opens, the flow path for the effervescent liquid experiences a sudden expansion causing the liquid to virtually explode and froth as it passes beyond the valve pinch point. The frothing liquid then passes between the core member and chamber wall and is dispensed with an undesirably high foamy content.

In my U.S. Pat. No. 5,244,117 I disclose a single actuator dispenser valve wherein a frusto-conical core member has a rounded tip that seals the inlet opening at the narrow end of the frusto-conical valve chamber when the valve is closed. As the valve is opened, the rounded tip serves as a stagnation point to severely reduce the pressure of the liquid that is permitted to flow through the elongated and restrictive diffusing passage between the core member and the chamber wall. This arrangement reduces frothing as compared to the Leroy valve; however, even this arrangement is not optimal and can stand improvement.

I have also found that, in the valve of my aforesaid patent, cavitation tends to occur immediately downstream of the frusto-conical diffusion passage. Specifically, the gas in the flowing liquid tends to form bubbles which immediately collapse at this location within the valve. The result is a tendency to enhance undesirable frothing. Further, the volume of the valve chamber downstream of the core member has been found to be relatively important. Specifically, that volume must be small enough to maintain a sufficient back pressure to keep gas from escaping from the liquid within that volume.

I have also found that outlet spouts or spigots in prior valves for dispensing effervescent liquids are smoothly cylindrical along their internal surfaces. Liquid that drains through a spout from a larger volume naturally tends to flow vortically (i.e., eddy-like) rather than in a laminar straight fashion. The vortical flow results in turbulence and frothing in the egressing liquid.

SUMMARY OF THE INVENTION

In accordance with the present invention the valve disclosed in my aforesaid patent is improved by moving the on-off seal associated with the core member to a location downstream from the entrance to the valve chamber so that the stagnation point at the forward end of the core member no longer provides the seal. Rather, the seal is provided between the circumferentially continuous and axially elongated frusto-conical walls of the core member and chamber. Accordingly, the throttling and diffusing necessary to minimize frothing is achieved between the same elongated surfaces that provide the sealing function when the valve is closed. The pressurized liquid that begins to flow as the core is moved toward an open position thus experiences a very gradually widening flow path as the seal is removed. This is in contrast to a suddenly enlarged flow region provided immediately downstream of the pinch point closure in the Leroy valve.

In addition, a slight mutual divergence between the core and the chamber wall, on the order of one to five degrees, is provided at the downstream portion of the core and chamber interface. In the preferred embodiment, the divergence angle of the core remains constant but the chamber wall has a transition, downstream of which its divergence angle is a few degrees larger. This gradual divergence has been found to permit bubbles forming in the liquid to float out of the valve body with the liquid rather than collapsing and contributing to the formation of froth and foam between the core member and spout.

In order to prevent escape of gas from the liquid in the valve chamber section downstream of the core, that chamber section is provided with a volume sufficiently small to maintain a back pressure in the flowing liquid. This is achieved by keeping the volume of this section of the valve sufficiently small so that the exit spout serves as a flow restriction for flow egressing the downstream chamber section into the spout.

The exit spout interior wall is provided with baffles to prevent eddies or vortical flow patterns from developing as liquid egresses therethrough. In the preferred embodiment the transverse cross-section of the spout is constant throughout the spout length and takes the form of a cloverleaf. Other baffle configurations are, of course, possible to assure a laminar outflow that precludes frothing.

These and other objects, features and many of the attendant advantages of the present invention will be appreciated more readily as they become better understood from a reading of the following description considered in connection with the accompanying drawings wherein like parts in each of the several figures are identified by the same reference numerals.

DESCRIPTION OF THE PREFERRED EMBODIMENTS

Figure 1:
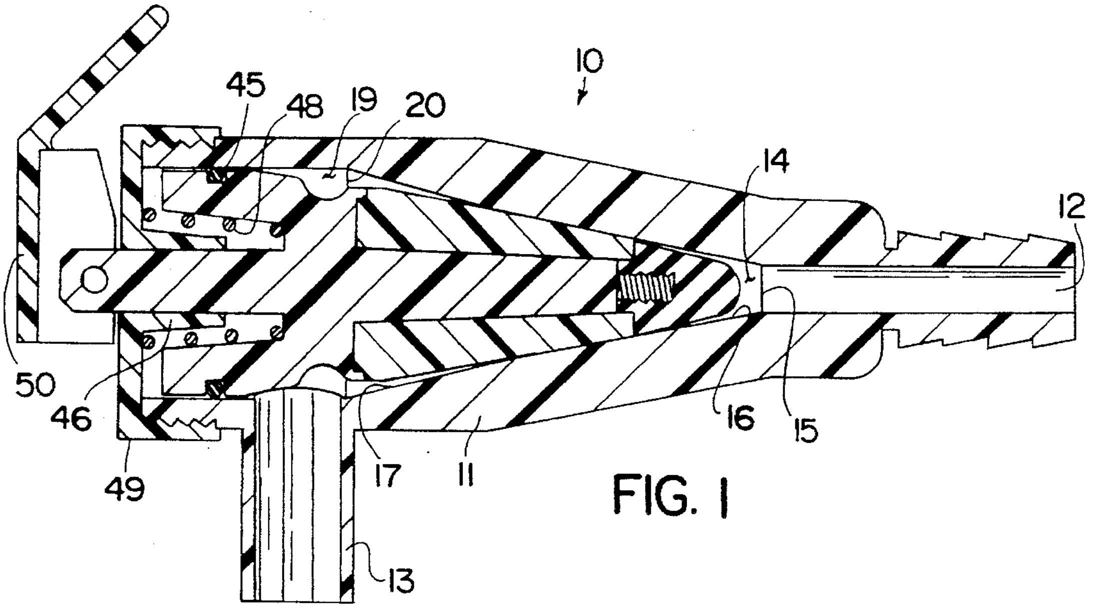
FIG. 1 is a view in longitudinal section of a valve of the present invention shown in its closed position.

Referring to the drawings in greater detail, a valve 10 constructed in accordance with the present invention includes a valve body 11 having an inlet passage 12 and an outlet passage or spout 13. Inlet passage 12 may be exteriorly barbed as shown to serve as a fitting for a supply tube for pressurized liquid delivered to the valve. In a particularly suitable application of the valve, inlet passage 12 is connected to a siphon tube extending to the bottom of a container of effervescent liquid, the head space of which is pressurized by nitrogen or similar gas as described in my U.S. Pat. No. 5,244,117. In addition, the valve would be mounted on the top of the container as also described in that patent. Of course, other applications of the valve are within the scope of the invention, and the liquid need not be effervescent and it may be placed under pressure by different means. Valve body 11 may be made of metal or plastic, preferably plastic, and in the preferred embodiment is a suitably hard and rigid, but not brittle, plastic. Typical plastic materials for this purpose include polyethylene, polypropylene, polyacrylates and polymethacrylates.

Inlet passage 12 communicates with a frusto-conical chamber 14 in valve body 11 via a chamber inlet opening 15. Inlet opening 15 is disposed coaxially with respect to chamber 14 at the narrow upstream end of the chamber. Chamber 14 has a first or upstream section 16 wherein the chamber wall has a regular frusto-conical configuration that diverges at a constant angle from opening 15 in a downstream direction. The divergence angle of the wall throughout chamber 16, relative to the central longitudinal axis of the chamber, is typically on the order of 8° to 14° and preferably 11°. Chamber 16 occupies between sixty and sixty-five percent of the axial length of chamber 14. A second or intermediate chamber section 17 occupies the remainder of the length of the frusto-conical portion of the chamber and also has a regular frusto-conical wall. The divergence angle of the wall in section 17 relative to the central longitudinal axis of the chamber is typically between 2° and 4° larger than the divergence angle of the wall in section 16. In the preferred embodiment the divergence angle in section 17 is 14°.

An annular transition line 18 demarks the intersection of the walls of chamber sections 16 and 17. A third or downstream chamber section 19 has a generally cylindrical wall and extends downstream from an annular transition line 20 demarking the intersections of sections 17 and 19. Sections 16, 17 and 19 of chamber 14 are coaxially disposed about the central longitudinal axis of the chamber.

Outlet spout 13 extends generally downward from valve body 11 in a direction perpendicular to the longitudinal axis of chamber 14. The inlet end of spout 13 communicates directly with downstream chamber section 19. The valve in use is oriented with its longitudinal axis disposed horizontally so that spout 13 is oriented vertically downward. The interior wall of spout 13 is provided with baffles 21 projecting radially inward to prevent development of tangential flow components in liquid egressing from the valve via the spout. In the illustrated embodiment, baffles 21 extend the entire length of spout 13 and define a flow passage having a four-leaf clover transverse cross-section. By preventing formation of tangential flow components, baffles 21 prevent vorticity in the egressing fluid and thereby eliminate a source of foaming in that liquid. It will be appreciated that baffles having other configurations for inhibiting tangential flow components may be utilized in place of the cloverleaf configuration.

Interiorly of chamber 14 there is disposed a valve member comprising a rod 31 extending longitudinally and coaxially through a frusto-conical core member 32. The core member is provided with a central longitudinal through bore 36 for the purpose of receiving rod 31. In the illustrated embodiment both rod 31 and bore 36 taper slightly in a distal or upstream direction. The distal tip of rod 31 is externally threaded at 33 and projects beyond the distal end of core member 32 to be threadedly received in a tapered hole in the widened end of a frusto-conical tip 34. The distal or narrow end 39 of tip 34 is rounded with a radius of curvature that provides a smooth transition (i.e., no edges or intersecting surfaces) into the frusto-conical configuration of the tip. By means of the threaded engagement, the wide end of tip 34 is secured in abutting relation against the narrow end of core member 32. To assure proper engagement between the tip and core member, the narrow flat end of the core member is provided with an annular recess defining an annular shoulder 35 concentrically surrounding the distal end of bore 36. That recess receives an annular projection 37 from the proximal wide end of tip 34 in abutting relation against shoulder 35.

The proximal wide end of core member 32 abuts an annular flange 40 located at the distal end of a stop member 42 formed integrally with and extending radially from rod 31 at a longitudinal location intermediate the ends of the rod. The distally facing surface of flange 40 is provided with an annular recess surrounding the rod and sized to axially receive an annular projection from the proximal end of core member 32. Flange 40 thus serves as a stop for the core member and, along with the threaded engagement of tip 34, defines the axial position of the core member on rod 31.

The maximum outside diameter of tip 34 at its proximal or wide end is substantially equal to the minimum outside diameter of core member 32 at its distal end. However, the downstream divergence angle of the frusto-conical periphery of tip 34 is slightly wider (i.e., diverging at a slightly greater angle) than the divergence of core member 32. Core member 32 has a constant divergence angle that substantially matches the divergence in section 16 of chamber 14. Accordingly, in the closed position of the valve (FIG. 1), core member 32 is in flush abutment with the wall of chamber section 16. This flush abutment is circumferentially continuous and extends over a considerable portion of the axial length of the core member. In this position, however, the more sharply tapered tip 34 distally diverges from the wall of chamber section 16 to create an annular nozzle-like configuration for a liquid entering the chamber at inlet opening 15.

Stop member 42 surrounds rod 32 and includes an arcuately recessed segment 41 immediately downstream of flange 40. Segment 41 is a concave surface of revolution defining a widened flow region immediately downstream of core member 32. Stop member 42 has a further segment 43 that expands immediately proximal of segment 41 in a generally frusto-conical configuration. Proximally of segment 43, on the other hand, member 42 is generally cylindrical and has an annular recess 44 radially defined therein to receive an O-ring 45 to sealingly contact that chamber wall near the proximal end of body 11.

Valve body 11 is externally threaded at its proximal end to engage an end cap 49 in the shape of a cup with an interiorly threaded lip. End cap 49 has a central aperture to permit the proximal end of rod 31 to extend therethrough. This aperture is preferably provided with a distally projecting sleeve 46 serving as a slidable support for the rod. The proximal end of stop member 42 has an annular recess 47 defined therein, surrounding rod 31, to receive sleeve 46 and a helical spring 48. Spring 48 is axially compressed between the end cap and stop member to continuously bias rod 31 distally toward the closed position of the valve. An actuator 50 is journaled in an aperture at the proximal end of rod 31 extending beyond cap 45. Actuator 50 is pivotable against the cap to selectively move rod 31 proximally against the bias force of spring 48 to thereby selectively open the valve. It will be appreciated that this particular actuator mechanism is shown by way of example only, and that any suitable mechanism for longitudinally displacing the rod 31 in the valve chamber may be employed. A number of examples of such actuators are illustrated and described in my aforesaid U.S. Pat. No. 5,244,117.

Tip 34 and rod 31 (including stop member 42) are made of metal or plastic but preferably a hard rigid plastic of the same type used for valve body 11. Core member 43 is made of a somewhat softer plastic, for example, silicone, that compresses slightly when urged against the wall of chamber section 16 in the closed valve position. In this regard, it is noted that the only pressure seal for closing the valve is provided between the circumferentially continuous and axially elongated frusto-conical surface of core member 32 and the similarly sloped angularly continuous, axially elongated frusto-conical wall of chamber section 16. The seal exists along a substantial length of the core surface and the chamber section wall, and it is enhanced by the resilient compressibility of the silicone material of the core member as it is forced against the chamber wall. Typically, this seal is provided throughout approximately one-half of the length of chamber section 16, although a seal extending along as little as ten percent of the wall section length would suffice for purposes of the present invention.

By way of example only, in one embodiment of the valve: the overall axial length of chamber 14 (including sections 16, 17 and 19) is 2.33 inches; the axial length of chamber section 16 is 0.98 inch; the axial length of chamber section 17 is 0.56 inch; the diameter of chamber section 19 is 0.57 inch; the axial length along the contacting sealing portions of the core member and section 16 is approximately 0.5 inch; the inner diameter of chamber section 19 is 0.67 inch; the divergence angle of section 16 is 11°; and the divergence angle of section 17 is 14°. The cloverleaf cross-section of spout 13 has a diameter between opposite leaves of 0.375 inch, each leaf is 0.125 inch wide, and the radius of curvature of each leaf is one-sixteenth inch. This valve, designed to dispense beer, has a radius of curvature for section 41 of 0.94 inch.

In describing the operation of the valve, it is assumed that an effervescent liquid such as beer or soda pop is being dispensed, although the valve operation is not to be taken as so limited. As the valve is opened by pivoting actuator 50 clockwise (as viewed in FIG. 2), the seal provided between the core member surface and the wall of chamber section 16 is broken, and the pressurized liquid is permitted to flow through the valve. Liquid entering the chamber at upstream inlet opening 15 is initially confronted by the smoothly rounded distal end of tip 34 which creates a pressure stagnation point in the incoming liquid. The flow is smoothly diverted by the rounded tip along the sides of tip 34 where the tip surface and section wall converge to create, in effect, an annular nozzle-like path leading into the diffuser flow path created between the core member 32 and the wall of chamber section 16. The pressure of the liquid increases in this nozzle-like region and helps to establish laminar flow conditions through the subsequent diffuser path.

The diffuser flow path created between the core member surface and the wall of chamber section 16 is annular in cross-section with a constant radial thickness throughout the length of the path. However, since the circumference of the annular path gradually increases with downstream distance, the cross-sectional area of the path likewise increases in spite of the constant radial spacing between the core member and the chamber wall. The liquid thus diffuses and expands very gradually, thereby avoiding frothing that accompanies pinch points and sudden widening in a flow path. Importantly, the diffusing flow path is created by the same facing surfaces that establish the only pressure seal for the valve when the valve is closed.

Upon entering chamber section 17, the flowing liquid is permitted to expand at a slightly greater rate due to the increased divergence between the core member and the chamber wall. This increased but still gradual expansion prevents cavitation at the exit of the diffuser path and permits the flow to remain laminar. The increased but gradual expansion region in section 17 may be looked upon as being analogous to impedance matching between the diffuser path and the larger expansion volume in chamber section 19. Such impedance matching effectively eliminates sudden transverse dimensional changes in the overall flow path and thereby avoids frothing.

In chamber section 19, where the volume is enlarged by the concave surface of revolution defining section segment 41, the diffused liquid is collected immediately prior to being dispensed through spout 13. The collected liquid is allowed to drain out of this section through the spout without encountering any bends or sudden transitions in its flow path. Baffles 21 in the spout assure that vortical flow is not created in the spout and thereby serve as additional protection against frothing. The volume of the collection region in chamber section 19 must be small enough so that the spout serves as a flow restrictor sufficient to create a back pressure in that region to prevent gas from escaping from the effervescent liquid. The volume requirement is dependent upon the carbonation pressure in the dispensed liquid, it being understood that a greater back pressure (and therefore a smaller volume) is required for more highly pressurized soda pop than for lower pressured beer.

Figure 2:
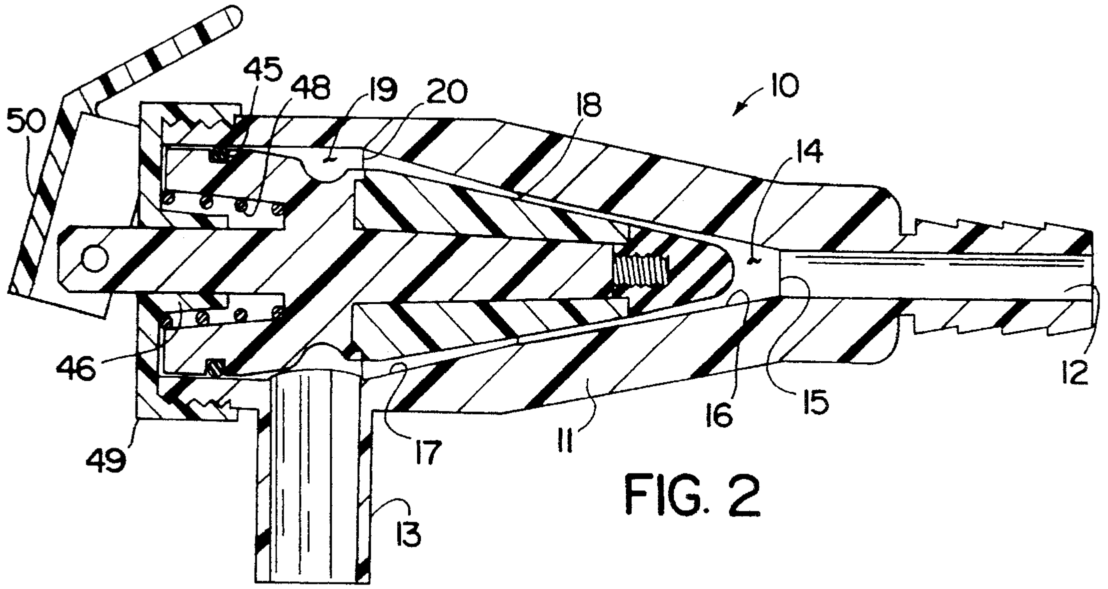
FIG. 2 is a view in longitudinal section of the valve of FIG. 1 shown in an open position.
Figure 3:
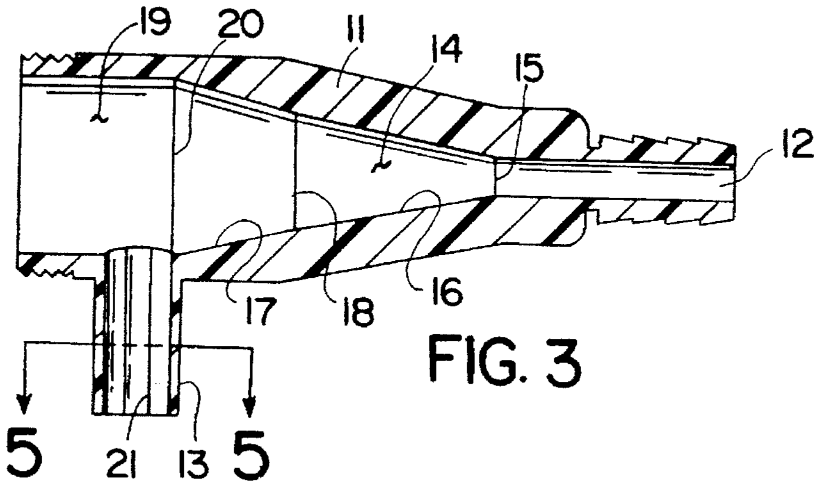
FIG. 3 is a view in longitudinal section of the body portion of the valve of FIG. 1.
Figure 5:
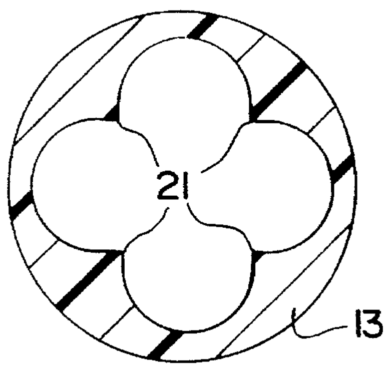
FIG. 5 is a view in section of the valve spout taken along lines 5—5 of FIG. 3.

Since valve 10 is typically oriented as shown in FIGS. 1 and 2 with its longitudinal axis horizontal, dispensed liquid cannot remain within the valve chamber after the valve is closed. Instead the liquid is directed, by the frusto-conical chamber wall slope and by the tapered segment 43 of the stop member, to the downwardly directed spout 13. Therefore, there is virtually no residue of unpressured liquid left to spoil in the valve between dispensing operations.

As described above, by using the same elongated sealing surfaces to effect valve closure as are used to create the diffuser path, the valve requires only a single actuator while avoiding pinch points that create explosive turbulence and frothing. In addition, the valve of the present invention operates over a wide range of liquid driving pressures to produce an optimal non-frothing dispensing flow rate that requires only minimum movement of the core member. Specifically, a desirable dispensing flow rate for beer or soda pop is on the order of two ounces per second. In a system where the head space in a container of liquid is pressurized by nitrogen or other such gas, the driving pressure can change from an initial 70 psi when the container is full down to nearly 1 psi when the container is almost empty. With the valve of the present invention, and with the dimensions in the example described above, I have found that core member 32 need not move axially more than one-sixteenth of an inch, even to accommodate the lowest driving pressure, in order to achieve the desired two ounces per second flow rate. Prior art valves typically require substantially greater axial translation to accommodate such a wide range of driving pressures to achieve the desired dispensing flow rate.

It will be appreciated that, in the preferred embodiment of the invention as described above, the wall of chamber section 16 serves the function of a valve seat while the facing surface of core member 32 serves the function of a movable valve member for purposes of closing and sealing the valve. This is a separate function from the establishment of the diffuser path by these elements when the valve is open. It must also be appreciated that, even if the seal function were to be provided independently of the wall of chamber section 16 and the facing surface of core member 32, their diffuser function, combined with the smoothly rounded tip 34, cooperate to minimize sudden transitions in the flow path through the valve, and thereby significantly reduce frothing.

Figure 4:
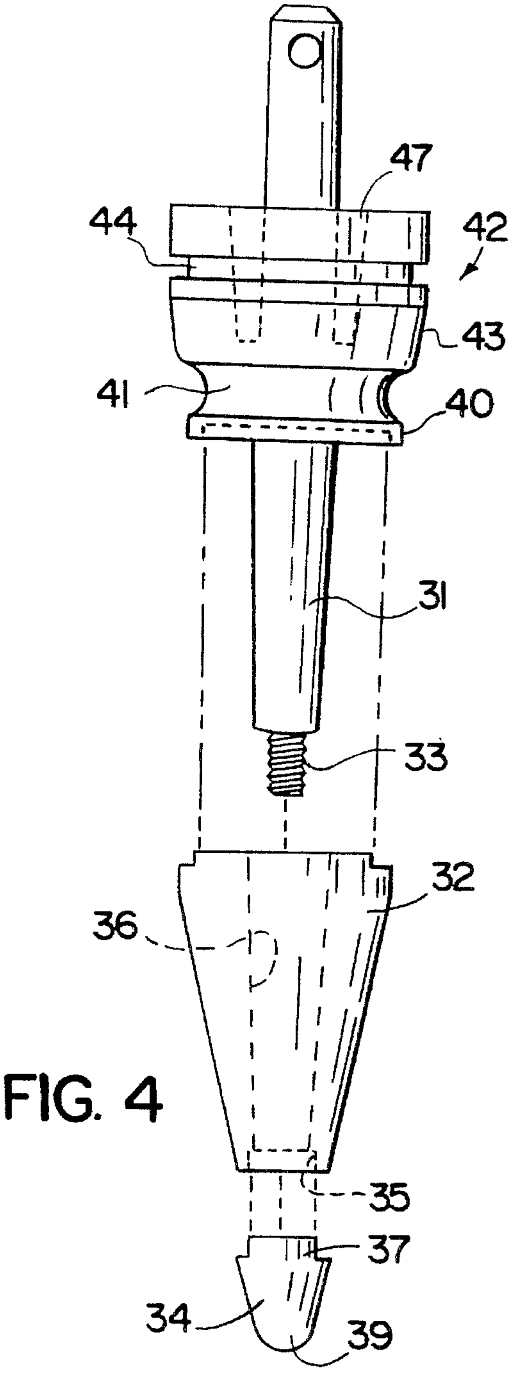
FIG. 4 is an exploded side view of the movable core member and related components of the valve of FIG. 1.

The valve member illustrated in FIG. 4 is made up of three separate parts 32, 34 and 42 that must be assembled. It will be appreciated that member 42 and tip 34 can be molded as a one-piece unit, and that the more pliant core member 32 can be molded directly onto that one-piece member.

From the foregoing description it will be appreciated that the present invention makes available a novel throttling and diffusing valve requiring only a single actuator to achieve a desirable dispensing flow rate for effervescent liquids without producing frothing in the liquid.

Having described preferred embodiments of a new and improved throttling and diffusing valve in accordance with the present invention, it is believed that other modifications, variations and changes will be suggested to persons skilled in the art in view of the teachings set forth herein. Accordingly, it is to be understood that all such variations, modifications and changes fall within the scope of the present invention as defined by the appended claims.

What is claimed is:

1. In a dispenser valve of the type wherein a frusto-conical core member is movable axially in a similarly configured frusto-conical chamber to both define a variably restrictive diffuser flow path through the chamber and to alternatively block and pass flow of liquid under pressure through said flow path from an inlet opening at the upstream end of said chamber to and through a spout downstream of said core member, said diffuser flow path having an annular transverse flow cross-section of substantially constant width but increasing circumference as a function of downstream location, said substantially constant width being adjustable by axially moving said core member in said chamber, the method of dispensing an effervescent liquid comprising the steps of:

(a) blocking flow of liquid through said diffuser flow path to turn off said valve solely by forcing a circumferentially continuous and axially elongated frusto-conical surface of said core member into flush abutment with an angularly continuous and axially elongated frusto-conical wall section of said chamber downstream of said inlet opening, wherein the flush abutment of said surface and said wall section constitutes the only pressure seal for blocking flow of liquid through said valve when the valve is turned off, and wherein said surface and wall section serve both to define said diffuser flow path when said valve is open and to block liquid flow when said valve is closed; and (b) throttling flow of liquid into said diffuser flow path by establishing an annular nozzle passage for liquid flowing into said diffuser flow path, said annular nozzle passage being established by different constant taper angles of said adjacent portions of said core member and chamber to define a flow cross-section that gradually decreases in a downstream direction throughout the length of the nozzle passage such that the diffuser flow path upstream end corresponds to the downstream end of the nozzle passage and has a flow cross-section that is the minimum flow cross-section for both the diffuser flow path and the nozzle passage.

2. The method of claim 1 further comprising the step of creating a pressure stagnation point at the upstream tip of said core member by providing a rounded surface on said tip for diverting liquid entering said chamber through said inlet opening around said tip and into said nozzle passage.

3. The method of claim 2 further comprising the step of providing a small divergence angle between, said frusto-conical core member surface and said frusto-conical chamber wall in a chamber region located immediately downstream of said diffuser flow path.

4. The method of claim 3 wherein said divergence angle is on the order of approximately three degrees.

5. The method of claim 4 further comprising the step of creating a small back pressure in a region of said valve chamber located between said diffuser flow path and said spout.

6. The method of claim 2 further comprising the step of:

preventing cavitation in liquid flowing in a region located immediately downstream of said diffuser flow path by providing a small divergence angle between said frusto-conical core member surface and said frusto-conical chamber wall in said region.

7. The method of claim 2 further comprising the step of:

creating a small back pressure in a region of said valve chamber located between said diffuser flow path and said spout.

8. The method of claim 2 further comprising the step of preventing cavitation in liquid flowing in a region of said chamber located immediately downstream of said diffuser flow path by providing a small divergence angle between said frusto-conical core surface and said frusto-conical chamber wall in said region, said divergence angle being on the order of approximately three degrees.

9. The method of claim 1 further comprising the step of impeding tangential flow components in said spout to prevent vortical flow therein.

10. A liquid dispenser valve comprising:

a valve body;

inlet and outlet passages for said valve body;

a chamber defined within the valve body;

restrictor means in the chamber providing a restrictive diffusing flow path for liquid through said chamber when the valve is opened;

on-off means disposed in said chamber for alternatively passing and blocking liquid flow through said chamber; and a common actuating means for moving the restrictor means together with said on-off means between a closed position in which the on-off means cuts off flow of liquid through said chamber and an open position in which maximum flow of liquid through said chamber is achieved;

wherein said restrictor means comprises:

an axially movable core member having an upstream tip and a circumferentially continuous and axially elongated frusto-conical surface disposed in said chamber;

a circumferentially continuous and axially elongated frusto-conical wall of said chamber having a downstreamwardly diverging angle;

wherein said surface of said core member has an upstream frusto-conical section with a first downstreamwardly diverging constant angle and an immediately adjacent downstream frusto-conical section with a second downstreamwardly diverging constant angle smaller than said first angle and substantially equal to said angle of said chamber wall, whereby said upstream section of said core member and said chamber wall define an annular nozzle with a downstreamwardly gradually constricting flow path;

wherein said core member is disposed concentrically with respect to said wall to define said diffusing flow path between said downstream section of said surface and said wall in said open position of said valve;

and wherein said on-off means comprises said frusto-conical wall and said downstream section of said frusto-conical surface which, in said closed position, abut one another in flush circumferentially continuous contact along a substantial length of said core member.

11. The valve of claim 10 wherein said inlet passage communicates substantially coaxially with said chamber, wherein said tip is smoothly rounded, and wherein said core member tapers to said rounded tip facing said inlet passage in axially spaced relation to the inlet passage in said closed position of said valve.

12. The valve of claim 11 further comprising a region in said chamber immediately downstream of said diffusing flow path and upstream of said outlet passage, said region having a transverse cross-section that gradually expands in a downstream direction.

13. The valve of claim 12 wherein said region is defined by a small angle of divergence between said wall and said surface.

14. The valve of claim 12 wherein said outlet passage has a predetermined transverse cross-section, and wherein said chamber has a region defined between said diffusing flow path and said outlet passage with a volume that is small enough relative to said predetermined cross-section to cause said outlet passage to serve as a flow restrictor creating a back pressure in said region.

15. The valve of claim 11 wherein said outlet passage is a spout having an interior wall with baffle means for preventing vortical flow of liquid in said spout.

* * * * *